United States Patent [19]

Gritzo

[11] Patent Number: 4,686,526

[45] Date of Patent: Aug. 11, 1987

[54] REMOTE RESET CIRCUIT

[75] Inventor: Russell E. Gritzo, West Melbourne, Fla.

[73] Assignee: The United States of America as represented by the United States Department of Energy, Washington, D.C.

[21] Appl. No.: 775,547

[22] Filed: Sep. 12, 1985

[51] Int. Cl.⁴ .................. H04Q 9/00; G05B 23/02; H04H 11/00

[52] U.S. Cl. .................. 340/825.06; 375/116; 371/17; 340/825.14; 379/93; 379/102

[58] Field of Search ............. 340/825.06, 825.22, 340/825.14; 375/116, 114; 371/22, 42, 17; 370/100, 108, 91; 179/2 A, 2 DP

[56] References Cited

U.S. PATENT DOCUMENTS

| | | | |
|---|---|---|---|
| 3,591,720 | 7/1971 | Othmer | 370/106 |
| 3,796,995 | 3/1974 | Strojny | 340/825.05 |
| 3,813,531 | 5/1974 | King et al. | 371/21 |
| 4,051,326 | 9/1977 | Badagnani et al. | 179/2 DP |
| 4,340,962 | 7/1982 | Wintzer et al. | 375/116 |
| 4,366,573 | 12/1982 | Rauch | 370/106 |
| 4,375,635 | 3/1983 | Leow et al. | 371/25 |
| 4,481,574 | 11/1984 | De Fino et al. | 179/2 DP |
| 4,535,198 | 8/1985 | Squicciarini | 179/2 DP |
| 4,596,981 | 6/1986 | Ueno et al. | 370/100 |

Primary Examiner—Donald J. Yusko
Attorney, Agent, or Firm—Samuel M. Freund; Ray G. Wilson; Judson R. Hightower

[57] ABSTRACT

A remote reset circuit acts as a stand-alone monitor and controller by clocking in each character sent by a terminal to a computer and comparing it to a given reference character. When a match occurs, the remote reset circuit activates the system's hardware reset line. The remote reset circuit is hardware based centered around monostable multivibrators and is unaffected by system crashes, partial serial transmissions, or power supply transients.

2 Claims, 5 Drawing Figures

REMOTE RESET CIRCUIT

BACKGROUND OF THE INVENTION

The present invention relates generally to a computer remote reset system and in particular to a software independent remote reset circuit. This invention is the result of a contract with the Department of Energy (Contract No. W-7405-ENG-36).

Computer systems based on a common bus, such as S-100, VME, or Multibus ® are widely used in the industry for a variety of applications ranging from control systems to software development stations. In addition, many home and personal computers are based on similar buses. Often it is convenient, and sometimes necessary, to physically separate the system's terminal or terminals from the computer. For example, in a system used for software development or user services the user may wish to have access through the telephone or long distance lines. In control applications, the computer system may be located in a harsh environment and must be isolated from the operator. If the user is near the system, a reset is just a push of the switch. If, however, the user is at a remote terminal or communicating through a telephone link, a reliable reset is difficult to provide.

In some computer systems the operating system software supports a reset from a remote terminal. In many cases, however, the software under development may cause the system's software to crash. As a result, the computer may fail to respond to the terminal, thus rendering the software supported reset function useless.

It is therefore an object of the present invention to provide a remote reset circuit that is completely independent of software.

It is another object of the present invention to provide a stand-alone remote reset circuit that is independent of other system hardware such as the UART or other terminal communications devices.

It is yet another object of the present invention to provide a remote reset circuit for which a system crash will not affect the availability of a user initiated system reset.

SUMMARY OF THE INVENTION

To achieve the foregoing and other objects, and in accordance with the purposes of the present invention, as embodied and broadly described herein, the apparatus of this invention may comprise a remote reset circuit acting as a stand-alone monitor and controller by clocking in each character sent by a terminal to a computer and comparing it to a given reference character. When a match occurs, the remote reset circuit activates the system's hardward reset line. The remote reset circuit is hardware based and designed around monostable multi-vibrators. As such, it is unaffected by system crashes, partial serial transmissions, or power supply transients.

An advantage of the present invention is that the remote reset circuit is hardware oriented and does not require software configuring or initialization.

Another advantage of the present invention is that the remote reset circuit has an easily selectable reset character.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE PREFERRED EMBODIMENT

For the purpose of this description, a tilde ($\sim$) before a signal name indicates the inverted version of that signal, e.g., $\sim$Tsync is the inverse of Tsync. A slash (/) after a signal name indicates that the signal is active low, e.g., RESET/ is active, or asserted at a low logic level.

Figure 1A:
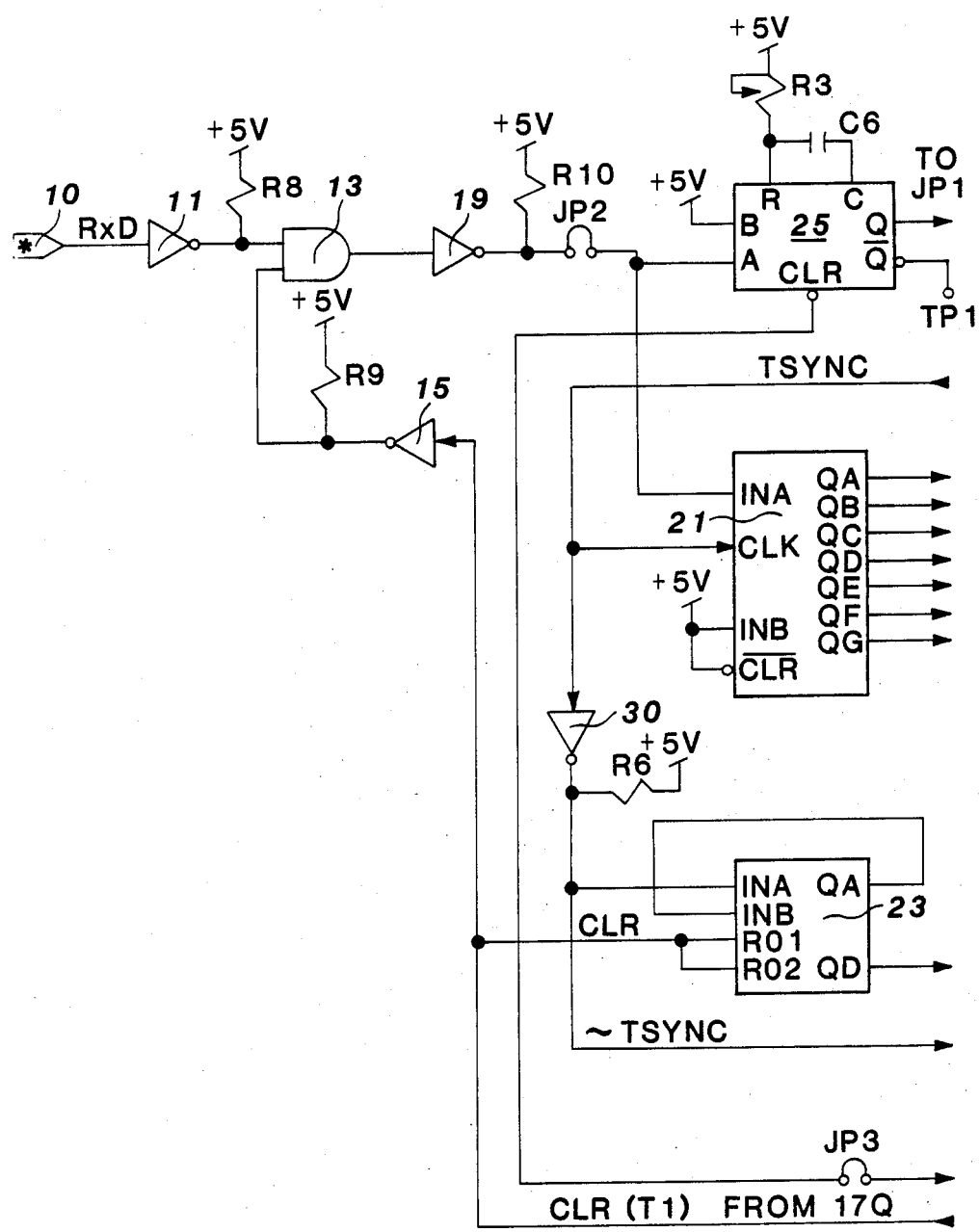
FIGS. 1A and 1B together form a logic diagram of an embodiment of the remote reset circuit of the present invention.
Figure 1B:
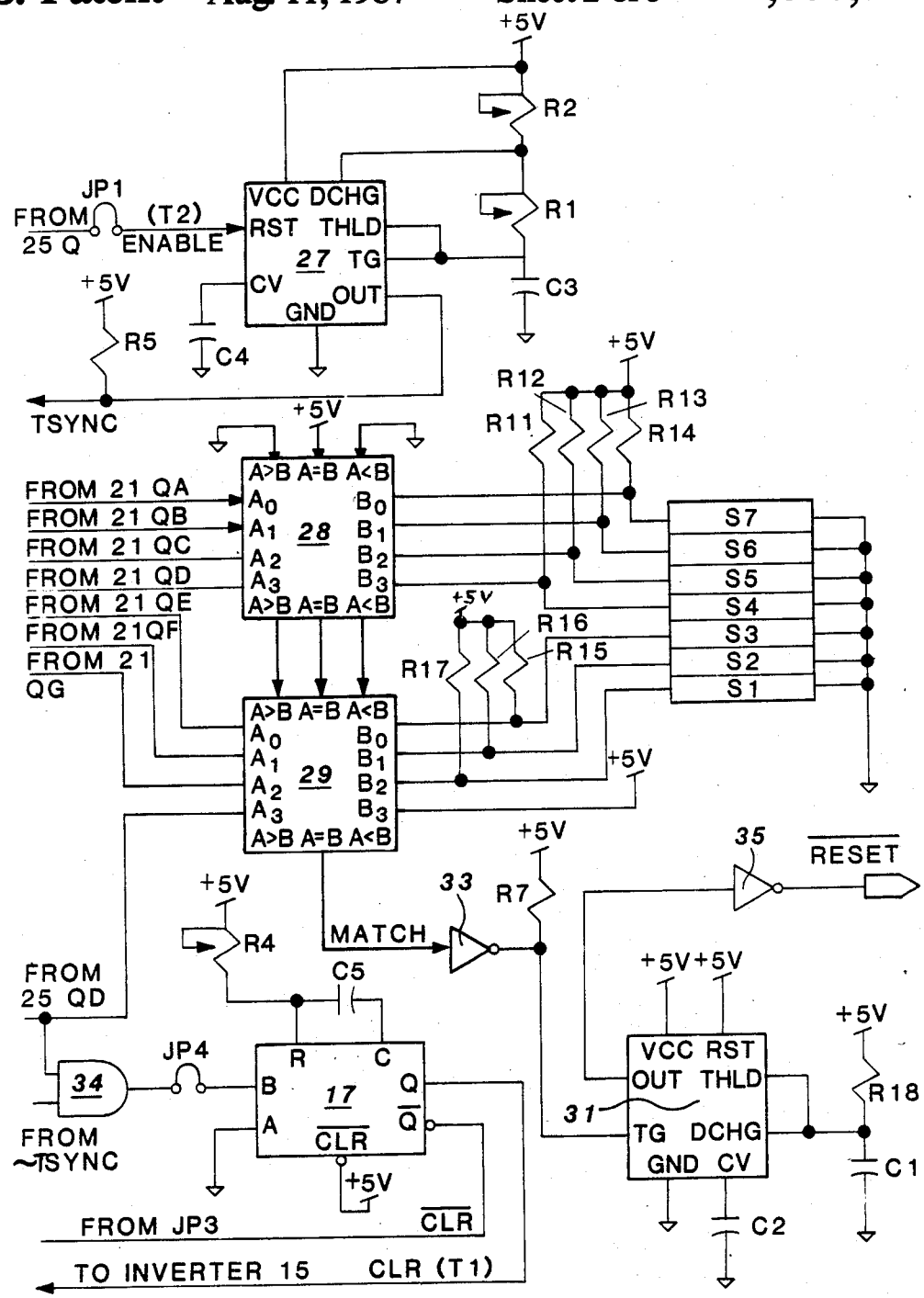

To understand the operation of the invention, assume that the multibus ® computer system remote reset circuit, shown in FIGS. 1A and 1B, has had no input for an arbitrarily long time. With no input, the RxD line is high. RxD is brought in at input connection 10, inverted in inverter 11 and logically ANDed in AND gate 13 with the clear signal (CLR) as inverted by inverter 15. The CLR (T1) is provided from a one-shot 17, and is normally low. Assuming that the one-shot 17 has timed out, and that CLR is indeed low, RxD is sent through AND gate 13 and inverter 19 to shift register 21 data input INA and to a second one-shot 25. A falling edge of RxD indicates a start bit, and triggers the second one-shot 25. The active high output Q of the second one-shot 25 enables and synchronizes timer 27 to provide an output of the Tsync clock. The Tsync clock output provides the clk input for shift register 21 and is inverted by inverter 30 to provide the $\sim$Tsync clock which is fed through AND gate 34 and JP4 to the B input of one-shot 17. Because of the duration (T2) of the second one-shot 25, the Tsync clock will be enabled long enough to clock in the start bit and all 7 data bits. Tsync is fed into the shift register 21 and $\sim$Tsync into the bit counter 23. Since the shift register 21 clocks data in on the rising edge of Tsync, bits are sampled in the approximate center. This allows for settling time. The bit counter 23 counts the number of samples (rising edges of Tsync, falling edges of $\sim$Tsync) and sets the QD output of bit counter 25 high when it counts to 8. This QD output of bit counter 25 enables $\sim$Tsync to the B input of the first one-shot 17. The next falling edge of Tsync (rising edge of $\sim$Tsync), after the 8th sample, triggers the first one-shot 17 to provide the CLR pulse. CLR clears the bit counter 23 and blocks RxD. By blocking RxD, a false state cannot occur at the fall of bit number 7, parity bits, stop bits, or noise at the end of the character. $\sim$CLR from second one-shot 25 clears the T2 pulse before time-out. Time-out is provided, however, to prevent hang-up in the event of partial transmission or transmission errors. In addition, the second one-shot 25 is used for T2 to ensure powering up in a known state. The fall of CLR indicates the end of the character, and the remote reset circuit of the present invention waits for the next fall of RxD. Returning now to shift register 21, the parallel date is brought out to two magnitude comparators 27 and 29 and is compared to the reference character set by switches S1-S7. The 8th bit of the reference character is tied high (B3 of 29), and the QD output of bit counter 25 is tied to A3 of magnitude comparator 29. This assures that a match cannot be found until all bits have been clocked in. (The start bit is thrown away, so the comparison is done between the reference character plus one high bit and the seven transmitted bits plus QD of bit counter 23.) If no match is found, the character is ignored, and no reset is generated. If a match is found, the A=B output of magnitude comparator 29 goes high and triggers timer 31 through inverter 33. Timer 31 is a 555 timer set up in monostable mode, with a pulse time of approximately 10 ms. This 10 ms pulse is fed through an open collector inverter 35 to provide the reset pulse. RESET/.

Figure 2:
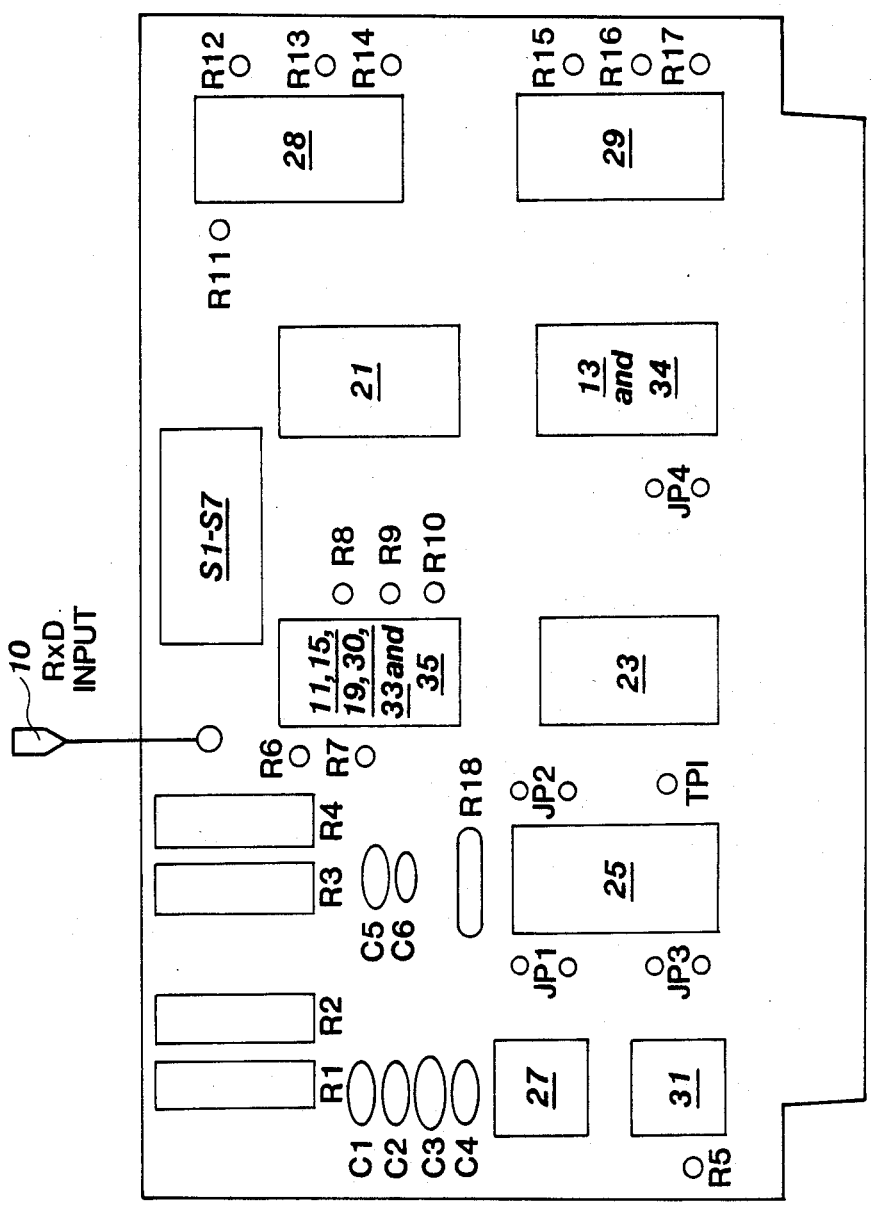
FIG. 2 is a layout diagram for the embodiment of FIGS. 1A and 1B.

The remote reset circuit of the present invention above described for Multibus ® based systems may be embodied in several implementations. The circuit may be implemented on a logic card, see FIG. 2, which plugs into the system bus. The data input may be taken from a RS-232 jumper, or from the input to the system's UART. The logic card need not be a full size board since the logic occupies little space and needs access to only the bus power (VCC), ground, and hardware reset lines. Otherwise, the logic card can be plugged into a bus, other than Multibus ®, with either a RS-232 or TTL compatible data input. The logic may also be incorporated as a part of the CPU or serial communications printed circuit board. Finally, the logic may be incorporated as a part of the serial communication integrated circuit (UART or USART).

Figure 3:
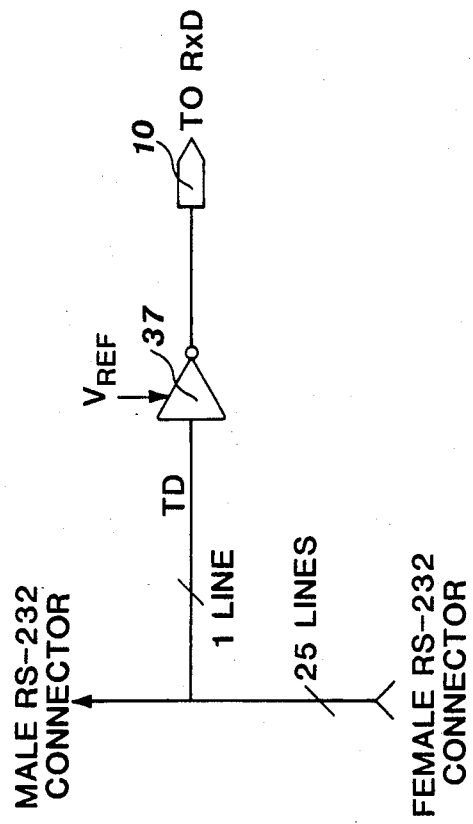
FIG. 3 is a logic diagram illustrating a method for inputting the embodiment of FIGS. 1A and 1B from RS-232 connectors.

If the data is TTL data, the UART RxD TTL input may be inputted directly to the RxD input 10. Alternatively data may be pulled from RS-232 connectors and fed through an inverter 37 to the RxD input 10, see FIG. 3.

Figure 4:
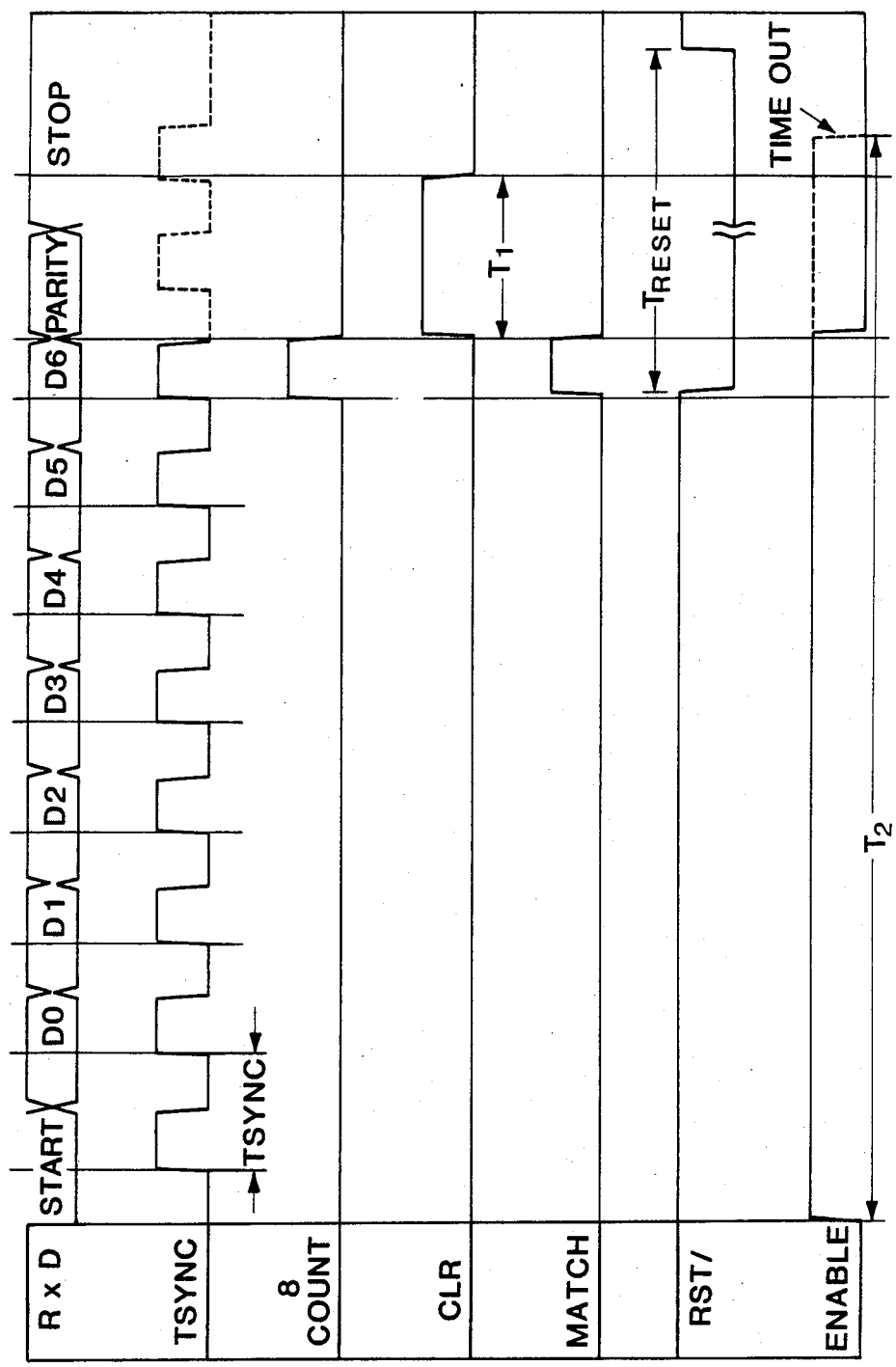
FIG. 4 is a timing diagram for the remote reset circuit of FIGS. 1A and 1B.

The remote reset circuit of the present invention may be set for use at any rate from 300 to 9600 Baud in the above-described embodiment. The following Baud rate timing adjustments must be made:

Tsync clock must be set for the Baud rate frequency; e.g., for 300 Baud, set Tsync for 300 Hz; Clear pulse (T1) must be set to 1.5 X Tsync period, ±20%; and Enable pulse (T2) must be set to 10 X Tsync period, ±20%; see FIG. 4.

With reference again to FIG. 1, the Baud rate is set by first removing the jumper plug JP1 and tying timer 27 RST terminal high (+5 volts). While observing Tsync on timer 27 OUT terminal, R1 and R2 are adjusted for a square-wave of the Baud rate frequency. Preferably the timer 27 is an NE555 timer. In some cases C3 will also have to be changed to achieve the desired square-wave frequency.

Second, replace jumper plug JP1 and remove jumper plugs JP2 and JP3. Then connect a TTL square-wave generator with a period of 10 X Tsync period to the one-shot 25 at input A and tie the one-shot 25 clear (CLR) high (+5 volts). At the falling edge of the signal at one-shot 25 input A, observe an active low pulse at test point TP1. Set R3 and C6 such that the low pulse is equal in duration to time T1.

Remove JP4 and connect a TTL square-wave generator with a period of approximately 20 X Tsync period to one-shot 17 input B. A rising edge of the signal on one-shot 17 input B initiates an active low pulse at one-shot 17 output $\overline{Q}$. Set R4 and C5 so that the duration of the low pulse at one-shot 17 output $\overline{Q}$ is equal to time T2. Then, remove the signal generator, and replace jumper plugs JP2, JP3, and JP4.

Select the character to be used as a reset character, and set switches S1-S7. Although any 7-bit ASCII character may be used as the reset character, an unassigned control key sequence is suggested. This helps prevent unintentional resets. The open position sets the bit to a "1" and the closed position sets it to a "0", thus S1-S7 are set to the binary representation of the reset character. S1 sets bit 0, S2 bit 1, and so forth.

If the remote reset circuit is implemented on a logic board, plug the board into an unused bus slot and connect the data input to the appropriate point in the system. This may be a connector to the RS-232 input, or a jumper to the TTL RxD input of the system UART as described hereinabove.

To use the remote reset control, type the selected reset character on a terminal keyboard and observe the system reset.

In the preferred embodiment, components and elements may be selected as follows:

| COMPONENT | PART # | DESCRIPTION |
| --- | --- | --- |
| 27 | NE555 | Timer |
| 31 | NE555 | Timer |
| 17, 25 | 74LS221 | Dual One-Shot |
| 11, 15, 19, 30, 33, 35 | 74LS05 | Hex Open Collector Inverter |
| 23 | 74LS293 | 4-Bit Binary Counter |
| 21 | 74LS164 | 8-Bit Parallel OutPut Shift Register |
| 13, 34 | 74LS08 | Quad AND Gate |
| 28 | 74LS85 | 4-Bit Magnitude Comparator |
| 29 | 74LS85 | 4-Bit Magnitude Comparator |
| 37 | DS1489 | RS-232 to TTL Converter optional) |
| S1-S7 | | Dip Switch |
| R1-R4 | | 100K Trim Pot, 10 Turn |
| R5, R18 | | 10K ¼ Watt Resistor |
| R6-R10 | | 5.1K ¼ Watt Resistor |
| R11-R17 | | 3.3K ¼ Watt Resistor |
| C1, C6 | | 1uf Ceramic Capacitor 35 WVDC |
| C2, C4 | | 6800 ph Ceramic Capacitor, 35 WVDC |
| C3 | | 0.1 uf Ceramic Capacitor, 35 WVDC |
| C5 | | 0.47 uf Ceramic Capacitor, 35 WVDC |

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. A remote reset circuit for remotely resetting a digital system, the remote reset circuit accepting a receiver data (RxD) signal and generating a reset signal upon receiving the correct RxD reset signal, the remote resetting circuit comprising in combination:
    adjustable one-shot means triggered by the RxD signal for providing a timed pulse output long enough in duration to permit the clocking in of a desired number of bits transmitted at a predetermined baud rate from the source of the RxD signal;
    timing means triggered by the timed pulse output of said adjustable one-shot means for providing a synchronous clock signal (Tsync);
    counting means triggered by the Tsync clock signal for counting the desired number of bits clocked in from the source of the RxD signal;
    means for presetting a desired reset pattern of bits;
    means for comparing the bits in the desired number of bits clocked in from the source of the RxD signal with the desired reset pattern of bits and for providing a match signal when the desired number of bits clocked in from the source of the RxD signal compares in pattern with the desired reset pattern of bits; and
    means for generating a signal to reset the digital system upon receipt of the match signal from said means for comparing.

2. A remote reset circuit for remotely resetting a digital system, the remote reset circuit accepting a receiver data (RxD) signal and generating a reset signal upon receiving the correct RxD signal, the remote resetting circuit comprising in combination:
    one-shot means triggered by the RxD signal for providing a timed pulse output long enough in duration to permit the clocking in of a desired number of bits transmitted from the source of the RxD signal;
    adjustable timing means triggered by the timed pulse output of said one-shot means for providing an approximately square-wave synchronous clock signal (Tsync) having adjustable duration;
    counting means triggered by the Tsync clock signal for counting the desired number of bits clocked in from the source of the RxD signal;
    means for presetting a desired reset pattern of bits;
    means for comparing the bits in the desired number of bits clocked in from the source of the RxD signal with the desired reset pattern of bits and for providing a match signal when the desired number of bits clocked in from the source of the RxD signal compares in pattern with the desired reset pattern of bits; and
    means for generating a signal to reset the digital system upon receipt of the match signal from said means for comparing.

* * * * *